United States Patent
Haugh et al.

(10) Patent No.: US 9,476,321 B2
(45) Date of Patent: Oct. 25, 2016

(54) TURBOMACHINE FLUID DELIVERY MANIFOLD AND SYSTEM

(71) Applicant: United Technologies Corporation, Hartford, CT (US)

(72) Inventors: Tony Haugh, Farmington, CT (US); Michael E. McCune, Colchester, CT (US); James B. Coffin, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 1150 days.

(21) Appl. No.: 13/741,469

(22) Filed: Jan. 15, 2013

(65) Prior Publication Data

US 2014/0294558 A1    Oct. 2, 2014

Related U.S. Application Data

(60) Provisional application No. 61/703,381, filed on Sep. 20, 2012.

(51) Int. Cl.
*F01D 25/16* (2006.01)
*F01D 25/18* (2006.01)
*F02C 7/14* (2006.01)

(52) U.S. Cl.
CPC .............. *F01D 25/18* (2013.01); *F02C 7/14* (2013.01); *Y02T 50/675* (2013.01)

(58) Field of Classification Search
CPC .......... F01D 25/18; F01D 25/20; F02C 7/06; F02C 7/12; F05D 2260/98; F16H 57/0423; F16H 57/043; F16H 57/045
USPC ......... 415/112; 384/462, 473, 474; 184/6.12
See application file for complete search history.

(56) References Cited

U.S. PATENT DOCUMENTS

| 4,271,928 A | 6/1981 | Northern |
| 5,119,905 A | 6/1992 | Murray |
| 6,223,616 B1 | 5/2001 | Sheridan |

(Continued)

FOREIGN PATENT DOCUMENTS

| EP | 0737281 B1 | 3/1998 |
| EP | 2333250 A2 | 6/2011 |
| EP | 2559913 | 2/2013 |

OTHER PUBLICATIONS

International Search Report and Written Opinion for International Application No. PCT/US2013/059157 completed on Dec. 23, 2013.

(Continued)

*Primary Examiner* — Dwayne J White
*Assistant Examiner* — Jason Mikus
(74) *Attorney, Agent, or Firm* — Carlson, Gaskey & Olds, P.C.

(57) ABSTRACT

An example turbomachine fluid delivery manifold provides a journal fluid path and a gear mesh fluid path that is separate from the journal fluid path. An example turbomachine lubrication system includes a geared architecture having a journal bearing and a gear. In this example, a manifold provides a portion of a first fluid path and a portion of a second fluid path separate from the first fluid path. The first fluid path is operative to communicate a first fluid from a fluid supply to the journal bearing. The second fluid path is operative to communicate a second fluid from the fluid supply to a gear mesh.

17 Claims, 8 Drawing Sheets

(56) References Cited

U.S. PATENT DOCUMENTS

| | | | |
|---|---|---|---|
| 8,083,030 B2* | 12/2011 | Portlock | F01D 5/022 |
| | | | 184/6 |
| 8,205,432 B2 | 6/2012 | Sheridan | |
| 8,261,527 B1 | 9/2012 | Stearns et al. | |
| 9,057,284 B2* | 6/2015 | Coffin | F02K 3/06 |
| 2008/0093171 A1 | 4/2008 | Portlock | |
| 2009/0220330 A1 | 9/2009 | Henry et al. | |
| 2009/0252604 A1 | 10/2009 | Alexander et al. | |
| 2010/0317478 A1* | 12/2010 | McCune | F01D 25/166 |
| | | | 475/159 |
| 2012/0157256 A1* | 6/2012 | Takeuchi | F03D 11/0008 |
| | | | 475/159 |

OTHER PUBLICATIONS

International Preliminary Report on Patentability for International Application No. PCT/US2013/059157 mailed Apr. 2, 2015.

* cited by examiner

TURBOMACHINE FLUID DELIVERY MANIFOLD AND SYSTEM

CROSS-REFERENCE TO RELATED APPLICATIONS

This application claims priority to U.S. Provisional Application No. 61/703,381, which was filed on 20 Sep. 2012 and is incorporated herein by reference.

BACKGROUND

This disclosure relates generally to a fluid delivery manifold and, more particularly, to a fluid delivery manifold utilized to deliver fluid to different regions of a geared architecture and other areas of a turbomachine.

Turbomachines, such as gas turbine engines, typically include a fan section, a compression section, a combustion section, and a turbine section. Turbomachines may employ a geared architecture connecting portions of the compression section to the fan section. Other turbomachines may employ a geared architecture connecting other areas.

Turbomachines utilize various fluids, such as oil used to lubricate the geared architecture. The oil reduces friction and wear between the various components of the geared architecture. The oil removes thermal energy from the geared architecture to improve efficiencies. Different areas of the geared architecture wear in different ways and generate varying levels of thermal energy. Fluids other than oil can be used within the turbomachine.

SUMMARY

A turbomachine fluid delivery manifold according to an exemplary aspect of the present disclosure includes, among other things, a manifold providing a journal fluid path and a gear mesh fluid path that is separate from the journal fluid path.

In a further non-limiting embodiment of the foregoing turbomachine fluid delivery manifold, the manifold may further provide a bearing fluid path that is separate from both the journal fluid path and the gear mesh path.

In a further non-limiting embodiment of either of the foregoing turbomachine fluid delivery manifolds, the journal fluid path is configured to communicate fluid to a journal bearing of a geared architecture of a turbomachine, and the gear mesh path is configured to communicate fluid to a gear mesh of the geared architecture.

In a further non-limiting embodiment of any of the foregoing turbomachine fluid delivery manifolds, the journal fluid path is configured to communicate fluid at a first temperature to a journal bearing of a geared architecture, and the gear mesh fluid path is configured to communicate fluid at a second temperature to a gear mesh of the geared architecture of the turbomachine. The second temperature is different than the first temperature.

In a further non-limiting embodiment of any of the foregoing turbomachine fluid delivery manifolds, the manifold includes a plurality of first outlets from the journal fluid path, and a plurality of second outlets from the gear mesh fluid path. The plurality of first outlets are disposed radially outside the plurality of second outlets relative to a direction of flow through the turbomachine.

In a further non-limiting embodiment of any of the foregoing turbomachine fluid delivery manifolds, the manifold includes a plurality of screens each fluidically coupled to one of a plurality of second outlets from the gear mesh fluid path.

In a further non-limiting embodiment of any of the foregoing turbomachine fluid delivery manifolds, the plurality of screens may comprise at least twice the flow area of the supply passage.

In a further non-limiting embodiment of any of the foregoing turbomachine fluid delivery manifolds, each of the plurality of screens are received within a respective one of a plurality of spray bars.

In a further non-limiting embodiment of any of the foregoing turbomachine fluid delivery manifolds, each of the plurality of spray bars may provide a conduit configured to communicate from the screen to torque frame pin.

In a further non-limiting embodiment of any of the foregoing turbomachine fluid delivery manifolds, the manifold is secured to the geared architecture.

In a further non-limiting embodiment of any of the foregoing turbomachine fluid delivery manifolds, at least one of the plurality of first outlets may be configured to communicate fluid to a spray bar having a conduit that delivers fluid from the one of the plurality of first outlets to a torque frame pin.

A turbomachine lubrication system according to another exemplary aspect of the present disclosure includes, among other things, a geared architecture having a journal bearing and a gear, and a manifold providing at least a portion of a first fluid path and at least a portion of a second fluid path separate from the first fluid path. The first fluid path is operative to communicate a first fluid from a fluid supply to the journal bearing. The second fluid path is operative to communicate a second fluid from the fluid supply to the gear mesh.

In a further non-limiting embodiment of the foregoing turbomachine lubrication system, the manifold may provide at least a portion of a third fluid path separate from the first and second fluid paths, the third fluid path is operative to communicate a third fluid from the fluid supply to a bearing assembly of a turbomachine.

In a further non-limiting embodiment of either of the foregoing turbomachine lubrication systems, the first fluid is a lubricant at a first temperature, and the second fluid is the lubricant at a second temperature different than the first temperature.

In a further non-limiting embodiment of any of the foregoing turbomachine lubrication systems, the first fluid path terminates at a plurality of first outlets, and the second fluid path terminates at a plurality of second outlets that may be circumferentially offset from the plurality of first outlets.

In a further non-limiting embodiment of any of the foregoing turbomachine lubrication systems, the first fluid of the fluid supply is fluidically isolated from the second fluid of the fluid supply within the manifold, to permit the first fluid and the second fluid to have an independently maintained temperature, flow rate, or pressure relative to each other.

In a further non-limiting embodiment of any of the foregoing turbomachine lubrication systems, the fluid supply includes the first fluid in a first state and the second fluid in a second state that is different than the first state.

A method of communicating fluid to a geared architecture of a turbomachine according to yet another exemplary aspect of the present disclosure includes, among other things, providing a first path that fluidically couples a first supply of fluid to a journal bearing of a geared architecture, and providing a second path that fluidically couples a second supply of fluid to a gear mesh of a geared architecture. At least a portion of the first path and at least a portion of the second path are provided by a common manifold. The first path and the second path are separate and distinct from each other.

In a further non-limiting embodiment of the foregoing method of communicating fluid to a geared architecture of a turbomachine the first supply of fluid and the second supply of fluid are fluidically isolated to permit the first supply of fluid and the second supply of fluid to have an independently maintained temperature, flow rate, or pressure relative to each other.

In a further non-limiting embodiment of the foregoing method of communicating fluid to a geared architecture of a turbomachine, the method includes sending a third supply of fluid along a third path to a bearing of the turbomachine. At least a portion of the third path is provided by the common manifold. At least a portion of the third path is provided by the geared architecture.

Although the different examples have the specific components shown in the illustrations, embodiments of this disclosure are not limited to those particular combinations. It is possible to use some of the components or features from one of the examples in combination with features or components from another one of the examples.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
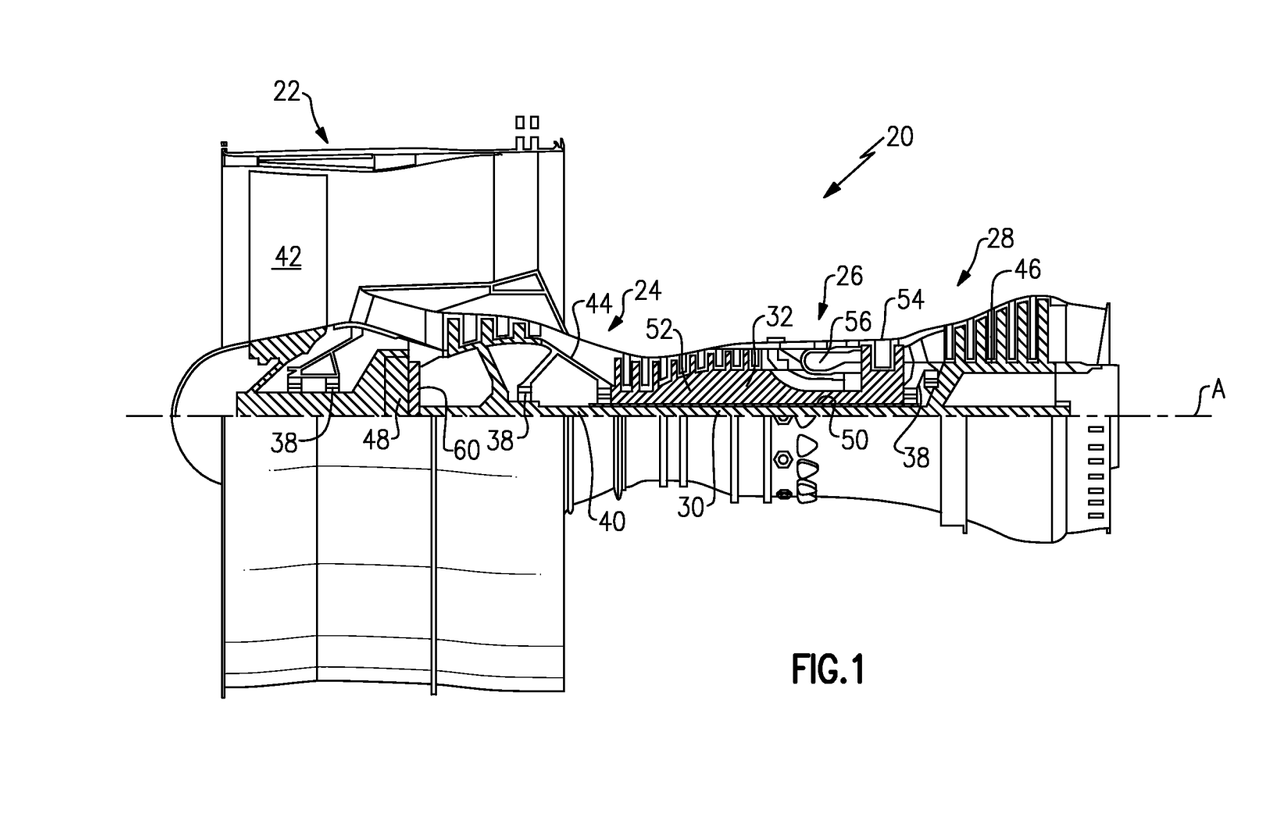
FIG. 1 shows a cross-sectional view of an example turbomachine.
Figure 2:
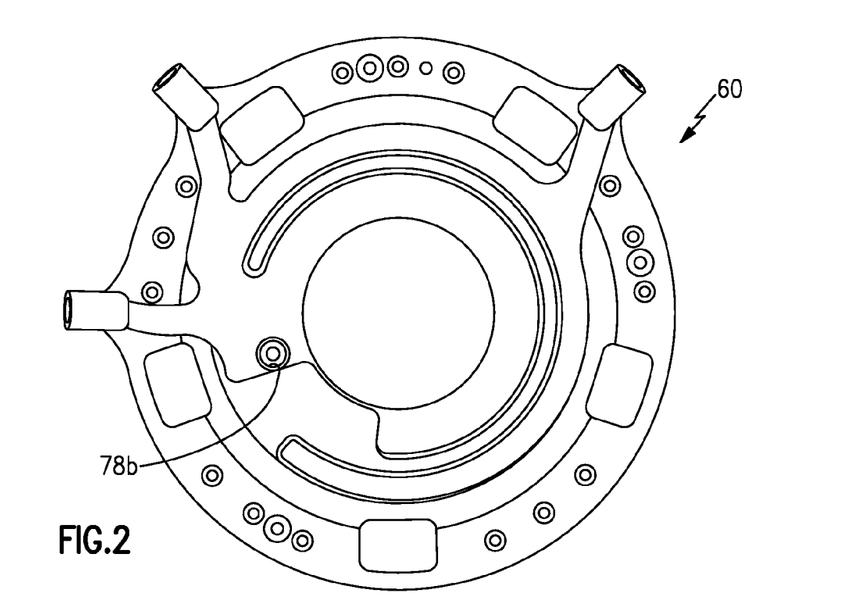
FIG. 2 shows a front view of an example fluid delivery manifold utilized within the turbomachine of FIG. 1.
Figure 3:
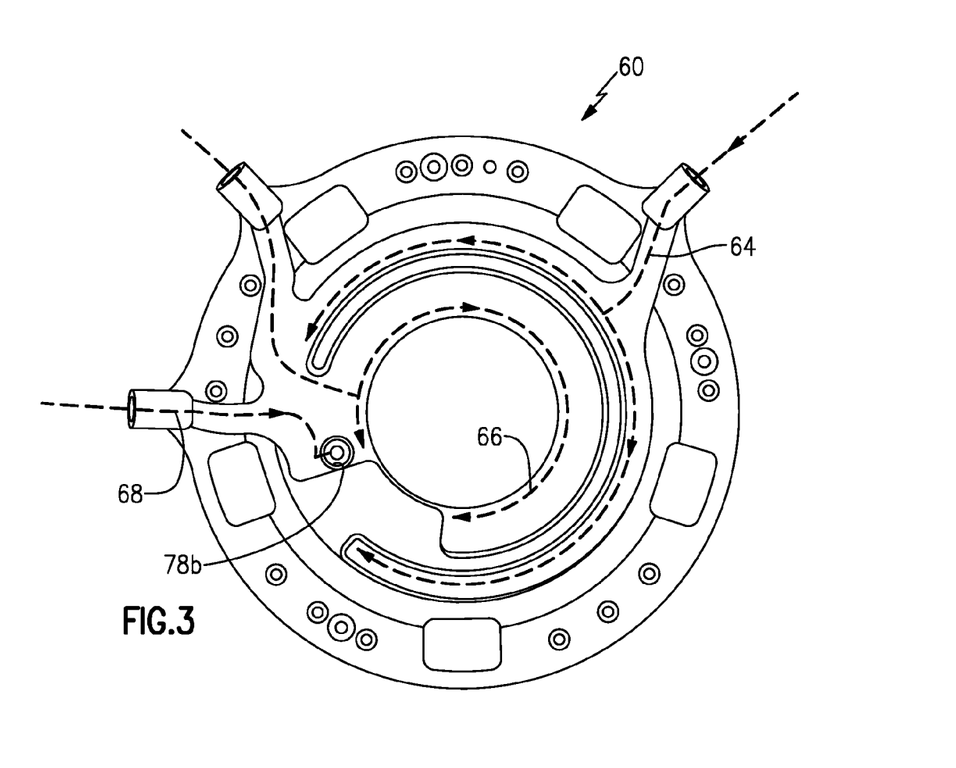
FIG. 3 shows fluid paths within the fluid delivery manifold of FIG. 2.
Figure 4:
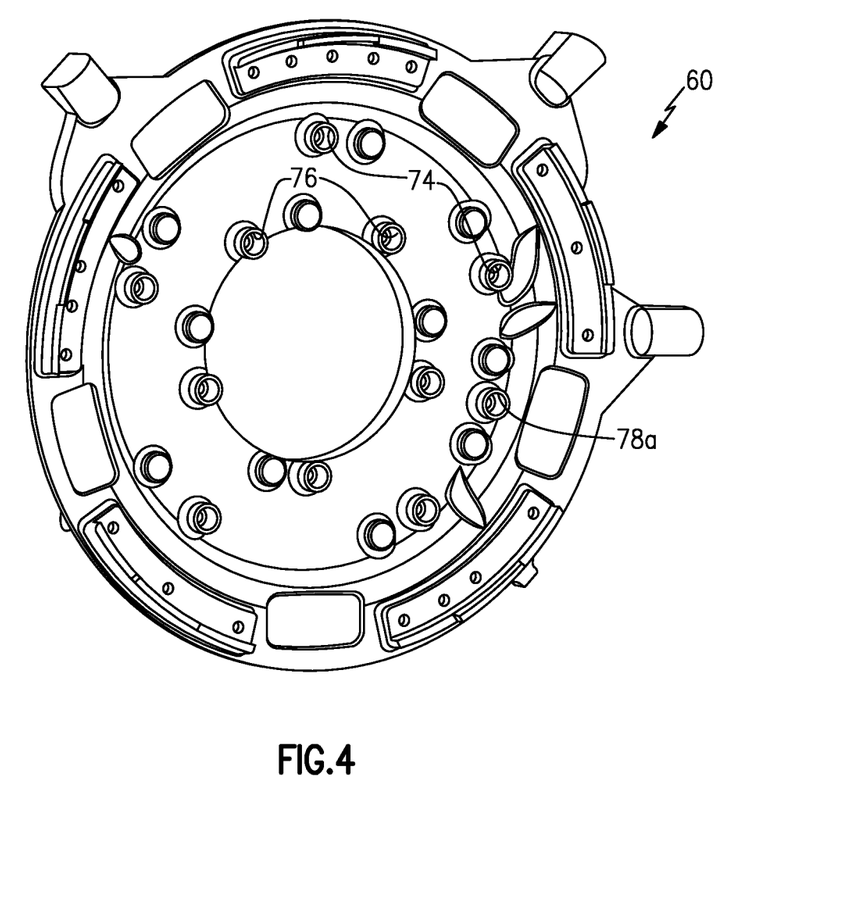
FIG. 4 shows an opposite side of the fluid delivery manifold of FIG. 2.

FIG. 1 schematically illustrates an example turbomachine, which is a gas turbine engine 20 in this example. The gas turbine engine 20 is a two-spool turbofan gas turbine engine that generally includes a fan section 22, a compression section 24, a combustion section 26, and a turbine section 28. Alternative engines might include an augmenter section (not shown) among other systems or features.

Although depicted as a two-spool turbofan gas turbine engine in the disclosed non-limiting embodiment, it should be understood that the concepts described herein are not limited to use with turbofans. That is, the teachings may be applied to other types of turbomachines and turbine engines including three-spool architectures. Further, the concepts described herein could be used in environments other than a turbomachine environment and in applications other than aerospace applications.

The fan section 22 drives air along a bypass flow path while the compression section 24 draws air in along a core flow path where air is compressed and communicated to the combustion section 26. In the combustion section 26, air is mixed with fuel and ignited to generate a high pressure exhaust gas stream that expands through the turbine section 28 where energy is extracted and utilized to drive the fan section 22 and the compression section 24.

The example engine 20 generally includes a low-speed spool 30 and a high-speed spool 32 mounted for rotation about an engine central axis A. The low-speed spool 30 and the high-speed spool 32 are rotatably supported by several bearing systems 38. It should be understood that various bearing systems 38 at various locations may alternatively, or additionally, be provided.

The low-speed spool 30 generally includes a shaft 40 that interconnects a fan 42, a low-pressure compressor 44, and a low-pressure turbine 46. The shaft 40 is connected to the fan 42 through a geared architecture 48 to drive the fan 42 at a lower speed than the low-speed spool 30.

The high-speed spool 32 includes a shaft 50 that interconnects a high-pressure compressor 52 and high-pressure turbine 54.

As used herein, a "high-pressure" compressor or turbine experiences higher pressures than a corresponding "low-pressure" compressor or turbine. The shaft 40 and the shaft 50 are concentric and rotate via bearing systems 38 about the engine central longitudinal axis A, which is collinear with the longitudinal axes of the shaft 40 and the shaft 50.

The combustion section 26 includes a circumferentially distributed array of combustors 56 generally arranged axially between the high-pressure compressor 52 and the high-pressure turbine 54.

In some non-limiting examples, the engine 20 is a high-bypass geared aircraft engine. In a further example, the engine 20 bypass ratio is greater than about six (6 to 1).

The geared architecture 48 of the example engine 20 includes an epicyclic gear train, such as a planetary gear system or other gear system. The example epicyclic gear train has a gear reduction ratio of greater than about 2.3 (2.3 to 1). Other gear reduction ratios can also be used.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low-pressure turbine 46 includes no more than about 6 turbine rotors schematically indicated at 34. In another non-limiting example embodiment, the low-pressure turbine 46 includes about 3 turbine rotors. A ratio between the number of fan blades and the number of low-pressure turbine rotors is between about 3.3 and about 8.6. The example low-pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

The low-pressure turbine 46 pressure ratio is pressure measured prior to inlet of low-pressure turbine 46 as related to the pressure at the outlet of the low-pressure turbine 46 prior to an exhaust nozzle of the engine 20. In one non-limiting embodiment, the bypass ratio of the engine 20 is greater than about ten (10 to 1), the fan diameter is significantly larger than that of the low-pressure compressor 44, and the low-pressure turbine 46 has a pressure ratio that is greater than about 5 (5 to 1). The geared architecture 48 of this embodiment is an epicyclic gear train with a gear reduction ratio of greater than about 2.5 (2.5 to 1). It should be understood, however, that the above parameters are only exemplary of one embodiment of a geared architecture engine and that the present disclosure is applicable to other gas turbine engines including direct drive turbofans.

In this embodiment of the example engine 20, a significant amount of thrust is provided by the bypass flow due to the high bypass ratio. The fan section 22 of the engine 20 is designed for a particular flight condition—typically cruise at about 0.8 Mach and about 35,000 feet. This flight condition, with the engine 20 at its best fuel consumption, is also known as "Bucket Cruise" Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example engine 20 is less than 1.45 (1.45 to 1).

"Low Corrected Fan Tip Speed" is the actual fan tip speed in ft/sec divided by an industry standard temperature correction of $[(Tram° R)/(518.7° R)]^{0.5}$. The Temperature represents the ambient temperature in degrees Rankine. The Low Corrected Fan Tip Speed according to one non-limiting embodiment of the example engine 20 is less than about 1150 fps (351 m/s).

Referring now to FIGS. 2-6 with continuing reference to FIG. 1, a fluid delivery manifold 60 forms a portion of a turbomachine lubrication system within the engine 20. The example fluid delivery manifold 60 is utilized to deliver a fluid, such as tribological fluids generally referred to in a non-limiting manner herein as oil, to various areas of the geared architecture 48, as well as other areas of the engine 20. The example manifold 60 is cast aluminum. In one exemplary embodiment, the metal is an aluminum alloy in accordance with materials specification AMS 4215. Prior to installation, the manifold 60 may be pressure tested to a relief valve pressure of the system. The manifold 60, especially any connection interfaces, may be hard-coated to reduce wear. The surfaces of the manifold 60 may be treated to inhibit corrosion. In other examples, the manifold 60 may be made of other materials and may be fabricated utilizing other techniques.

In this example, the fluid delivery manifold 60 is a common manifold that provides at least a portion of each of a first fluid path 64, a second fluid path 66, and a third fluid path 68. The first fluid path 64, second fluid path 66, and third fluid path 68 are each separate and distinct from each other. That is, no portion of the first fluid path 64 intersects any portion of the second fluid path 66 or the third fluid path 68 within the manifold 60.

Although the example manifold 60 provides portions of three separate fluid paths, another example manifold may provide portions of two separate fluid paths, four separate fluid paths, or some other number of separate fluid paths.

The first fluid path 64, the second fluid path 66, and the third fluid path 68 receive, in this example, fluid from a fluid supply 70. The example fluid supply 70 is able to deliver fluid to each of the paths 64, 66, 68 that is at a different temperature, pressure, and flow rate than the fluid delivered to the other paths. That is, the temperature, pressure, and flow rate of the fluid can be adjusted depending on which fluid path 64, 66, or 68 the fluid will flow through. The example paths 64, 66, and 68 include separate inlets spaced circumferentially from each other about the axis A.

The fluid supply 70 can include three distinct fluid supplies (one for each path) for this purpose. These distinct fluid supplies may be fluidically isolated from each other permitting the fluid supply 70 to independent maintain fluid at different states within the fluid supply. The fluid supply 70, for example, may independently maintain temperatures, flow rates, or pressures of the fluid provided to the paths 64, 66, or 68.

As the first fluid path 64, the second fluid path 66, and third fluid paths 68 are separate and distinct within the fluid delivery manifold 60, fluid within the paths 64, 66, and 68 substantially maintains differences in temperature, pressure and flow rate when moving (or communicating) through the fluid delivery manifold 60. Separate fluid paths, in this example, means that the fluid within each of the paths 64, 66, and 68 does not co-mix or co-mingle with fluid in the other paths within the manifold. The separate fluid paths are maintained due to physical barriers, such as walls, within the fluid delivery manifold.

Fluid moving through the fluid delivery manifold 60 along the first fluid path 64 exits from the fluid delivery manifold 60 at one of a plurality of first outlets 74. Fluid moving through the fluid delivery manifold 60 along the second fluid path 66 exits from the fluid delivery manifold 60 along one of a plurality of second outlets 76. Fluid moving through the fluid delivery manifold 60 along the third fluid path 68 exits from the fluid delivery manifold 60 at a third outlets 78a and 78b.

In this example, the plurality of first outlets 74 includes five separate outlets distributed circumferentially about the axis A. The manifold 60 can be secured to the geared architecture 48 such that the first outlets 74 are radially aligned with journal bearings 84 of the geared architecture 48. Fluid from the first outlet 74 is used to lubricate at least the journal bearings 84. The plurality of first outlets 74 are thus each operative to communicate fluid from the first fluid path 64 to the journal bearings 84, which fluidically couples the first fluid path 64 to the journal bearings 84. The temperature, pressure, and flow rate of the fluid moving within the manifold 60 along the first fluid path 64 can be adjusted to levels suitable for efficiently cooling and lubricating the journal bearings 84.

In this example, the plurality of second outlets 76 includes five separate outlets circumferentially distributed about the axis A. The plurality of second outlets 76 are each aligned with a spray bar 86a or 86b of the geared architecture 48. The plurality of second outlets 76 are circumferentially offset from the plurality of first outlets 74. Fluid moves from the plurality of second outlets 76 to the spray bars 86a and 86b where the fluid is then distributed to an associated gear mesh 87, between gears of the geared architecture 48, a torque frame pin 89, or some combination of these. The plurality of second outlets 86 are thus each operative to communicate fluid from the second fluid path 86 to at least the gear mesh 87, which fluidically couples the second fluid path 86 to at least the gear mesh 87. The mesh can be any mesh of sun, star, or ring gears within the geared architecture 48. The temperature, pressure, and flow rate of the fluid moving within the manifold 60 along the second fluid path 66 can be adjusted to levels suitable for efficiently cooling and lubricating the gear mesh.

The third outlets 78a and 78b axially oppose each other. The third outlets 78a and 78b are radially aligned with one of the second outlets 76. Fluid from the third outlet 78a is communicated along a path 90a to a first bearing assembly 88a, a second bearing assembly 88b, a sun gear spline 88d, or some combination of these. Fluid from the third outlet 78b is communicated from the fluid delivery manifold 60 to the bearing assembly 88e along a path 90b. Depending on specific requirements, fluid from the third outlet may be additionally used to lubricate a carbon seal, inlet coupling spline, etc.

Figure 5:
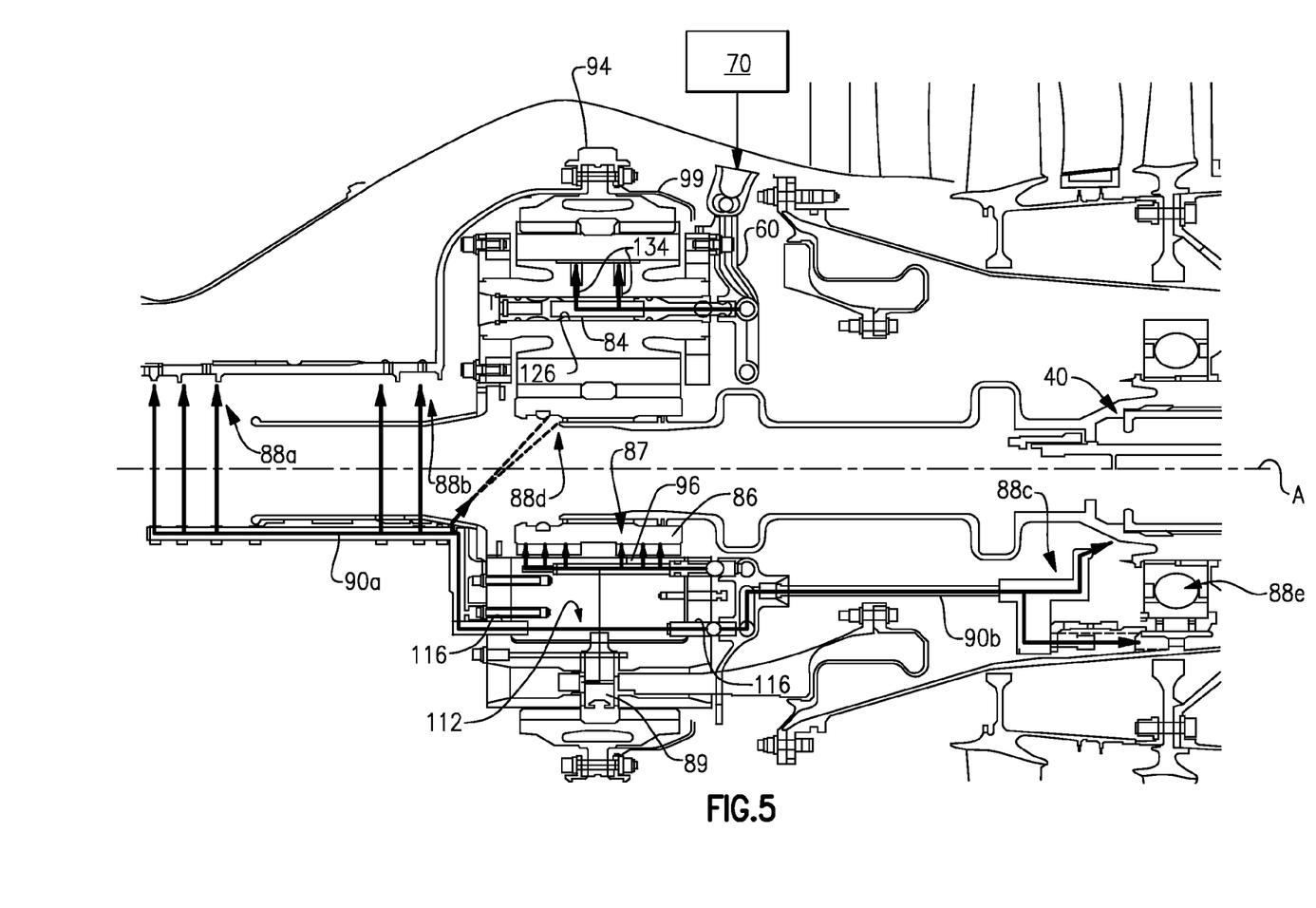
FIG. 5 shows a close-up section view of a geared architecture area within the turbomachine of FIG. 1.
Figure 6:
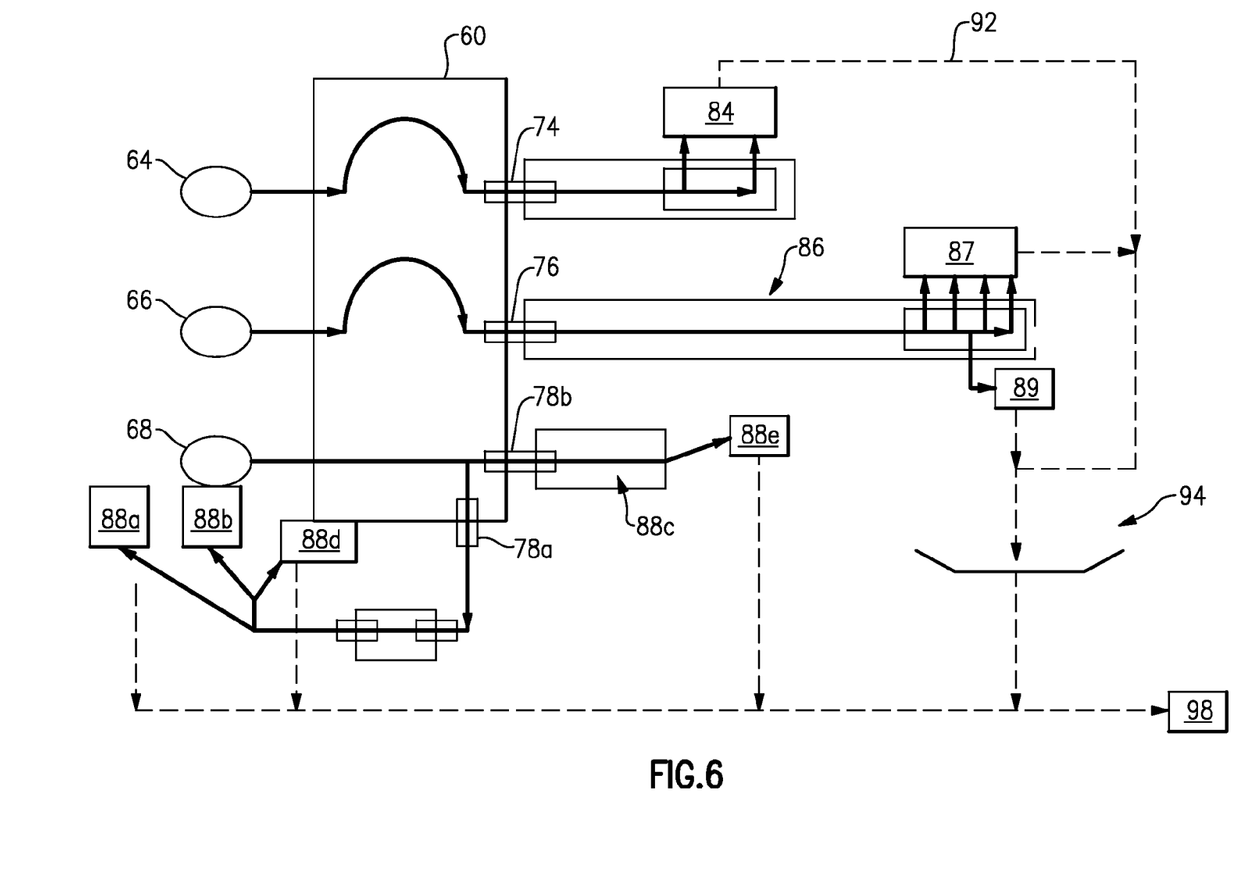
FIG. 6 shows the general flow of fluid through fluid paths within the fluid delivery manifold of FIG. 2.

In this example, the bearing assembly 88a is a No. 1 bearing of the engine 20, and the bearing 88b is a No. 1.5 bearing. Both bearing assemblies 88a and 88b rotatably support shafts at a position upstream from the geared architecture 48 relative to a direction of flow through the engine 20.

In this example, the bearing assembly 88e is a No. 2 bearing that rotatably supports the shaft 40. The geared architecture 48 is driven by the shaft 40. The fluid may be communicated to the inner race and seal of the bearing assembly 88e.

Fluid is scavenged at a scavenge location 98 after moving through various areas of the engine 20. The scavenged fluid may be cleaned and reintroduced to the fluid supply 70.

Fluid that was directed to the journal bearings 84 from the first fluid path 64 together with the fluid from the gear mesh 87 may move to a gutter 94 that feeds the auxiliary tank and then to the scavenge location 98. Fluid from the journal bearings 84 and the gear mesh 87 can be collected by a rotating baffle 99 prior to moving into the gutter 94. The gutter 94 is a circumferential gutter in this example.

Fluid from the third fluid path 68 may move directly to the scavenge location 98 after lubricating the bearing assemblies 88a, 88b, 88e, and the sun gear spline 88d.

Referring now to FIGS. 7A to 9, the example system utilizes two variations of spray bars, 86a and 86b. The example geared architecture 48 includes four of the spray bars 86a and one of the spray bars 86b. The spray bars 86a and 86b are distributed circumferentially about the axis A and between adjacent star gears of the geared architecture 48.

The spray bars 86a and 86b both include a bore 96 that couples directly with one of the plurality of second outlets 76. The bore 96 receives a screen 100. The screen 100, in one example, is at least twice and may be up to 4.13 times of the flow area of the supply passage percent open area. The example screen 100 has a hole size of from 0.014 to 0.018 inches (0.356 to 0.406 millimeters).

Figure 7A:
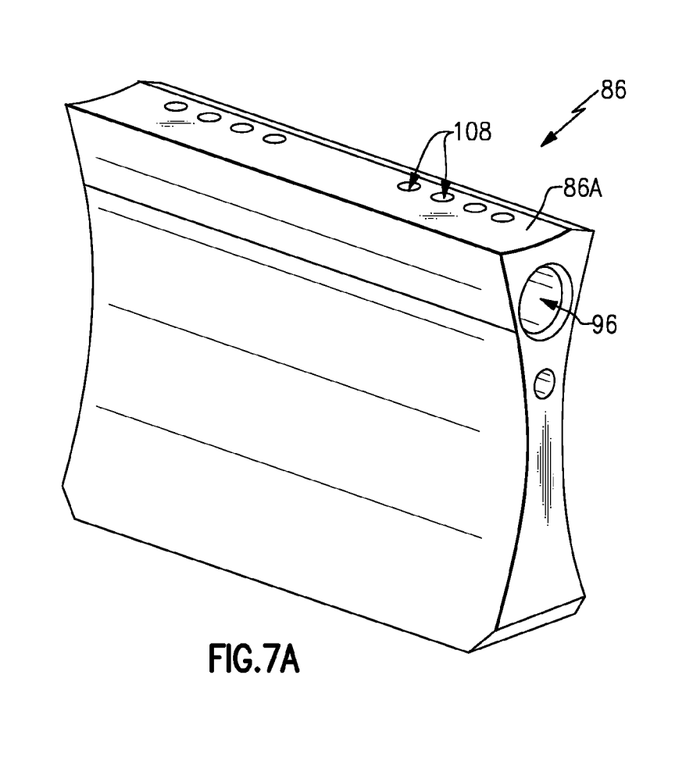
FIG. 7A shows a spray bar within a geared architecture of the turbomachine of FIG. 1.
Figure 8A:
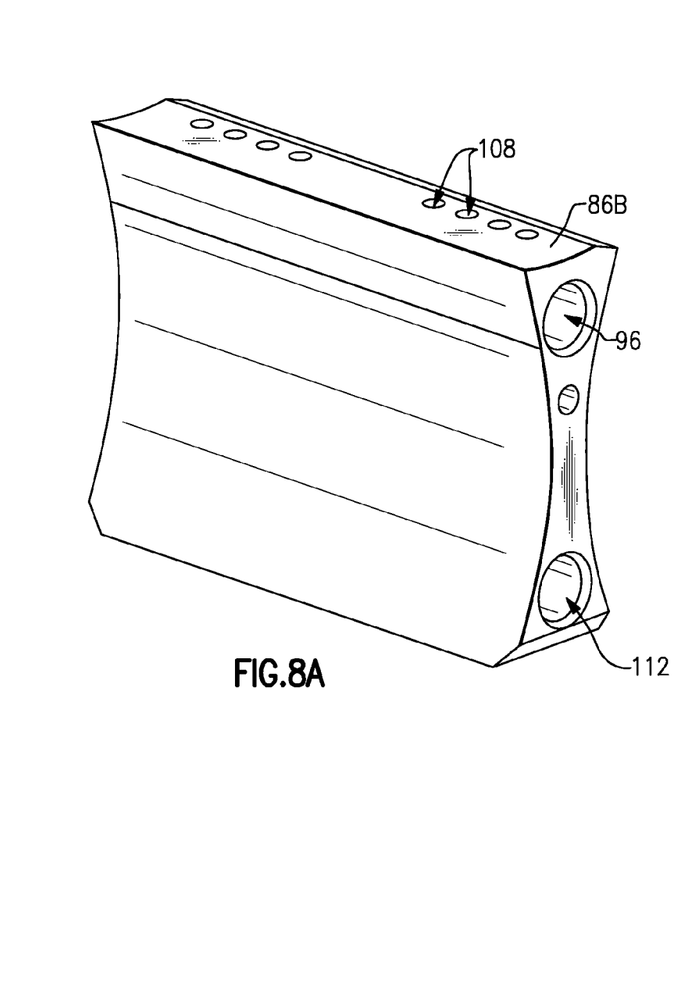
FIG. 8A shows another example spray bar within the geared architecture of the turbomachine of FIG. 1.

The example spray bars 86a and 86b are in one embodiment made of AMS 4120 aluminum alloy. Their exterior and core internal surfaces can be treated to prevent corrosion. Additionally, the connection interfaces hard coated to reduce wear, and "O" ring seals can be used at the connection interfaces to inhibit leakage.

Fluid moves along the second fluid path 66 through the plurality of second outlets 76 to the bore 96. Within the bore 96, fluid moves through apertures in the screen 100 into radially directed jets 108 within the spray bars 86a and 86b. Each of the spray bars 86a and 86b includes eight jets 108 in this example. Other example spray bars 86a and 86b may use more than eight jets 108 or less than eight jets 108.

Figure 7B:
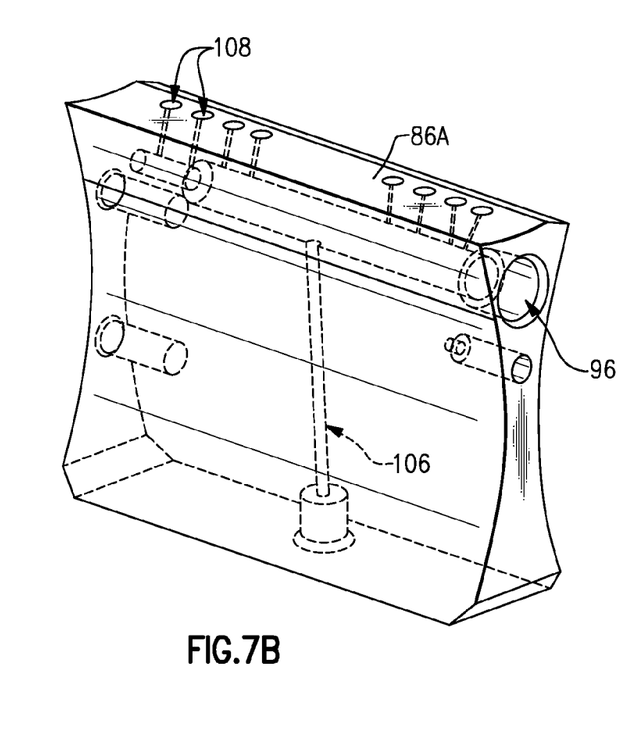
FIG. 7B shows a cut-away view of the spray bar of FIG. 7A.

Some of the fluid moves through the screen 100 and then along a radial conduit 106, which communicates the fluid to the torque frame pin 89.

Figure 9:
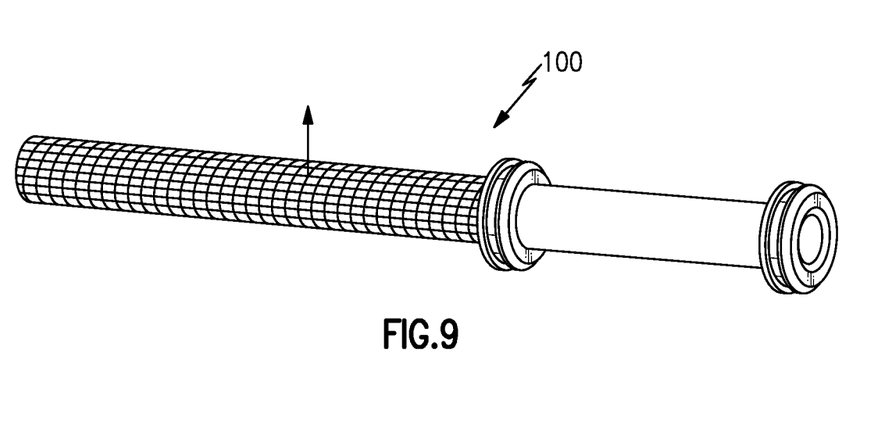
FIG. 9 shows an example screen utilized within the geared architecture of the turbomachine of FIG. 1.

The screen 100 filters particulate matter and other pollutants that could potentially damage the gears of the gear mesh 87 or the journal bearings 84 and related areas. Other areas of the lubrication system may include other filters in addition to the screen 100. That is, the screen 100 is just one area of the overall system where filtering may occur.

The example screen 100 is made of 17-4 precipitation hardened stainless steel. In other examples, the screen 100 may be made of other materials and may be fabricated utilizing other techniques.

The screen holes may be laser drilled screen holes having a diameter from 0.014 to 0.018 inches (0.36 to 0.46 millimeters). This metric conversion is provided only for convenience.

Figure 8B:
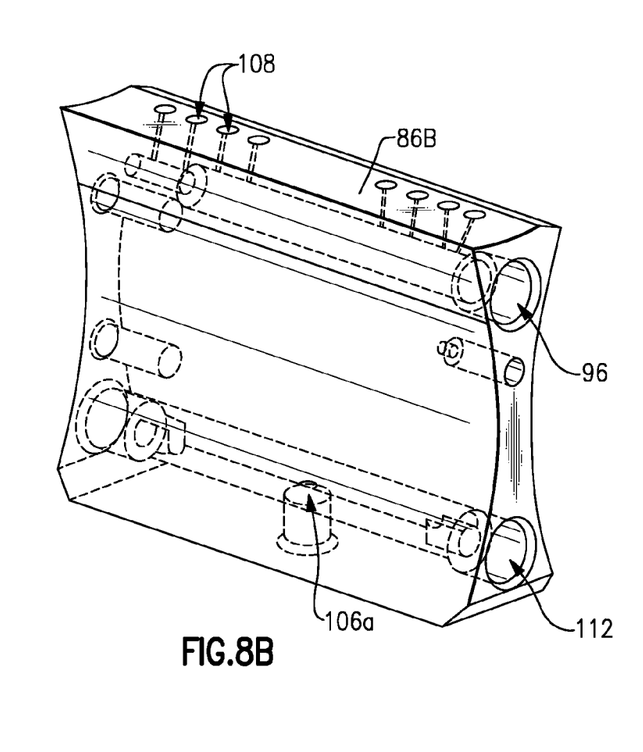
FIG. 8B shows a cut-away view of the spray bar of FIG. 8A.

Testing of the example screen 100 may include pressurizing the screen 100 at 1.5 times the normal operating pressure of the screen 100. Another test can be a burst pressure test up to two times the normal operating pressure of the engine 20. Another example test can be a valve pressure test at an oil pressure relief valve actuation pressure. To pass, these tests may require no bursting, yielding, or deformation of the screen 100 after the test. Yet another test may include a flow & pressure drop test at a cold oil Sea Level Take Off (SLTO) condition. The spray bar 86b differs from the spray bar 86a because the spray bar 86b has a bore 112 at a radial end of the spray bar 86b opposite the bore 96. Within the system, the bore 112 is aligned with the third outlets 78a from the third fluid path 68. Fluid communicates along the third fluid path 68 exiting from the fluid delivery manifold 60 at one of the third outlets 78a. This fluid is then moved through the bore 112 and then along a path 114 to the bearings 88a and 88b. Some of the fluid moving through the bore 112 may be delivered through a conduit 106a to one of the torque frame pins 89. Thus, in the embodiment of the spray bar 86a, the spray bar 86a includes the conduit 106. In the embodiment of the spray bar 86b, the conduit 106 is not used. In one aspect of the embodiment of the spray bar 86b, the fluid is delivered through the conduit 106a.

Transfer tubes 116 may be used to deliver fluid to the bores 112 from the third outlet 78a or 78b. In some examples, O-ring seals are used at the connection interfaces to the manifold 60.

Figure 10:
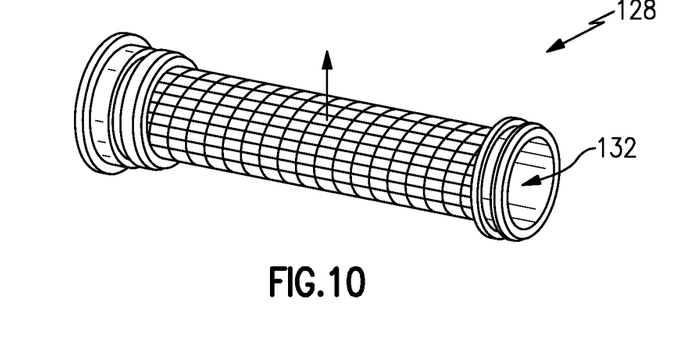
FIG. 10 shows another example screen utilized within the geared architecture of the turbomachine of FIG. 1.

Referring to FIG. 10 with continuing reference to FIG. 5, in this example, the journal bearings 84 include an opening that receives a screen 128. Fluid moves along the first fluid path 64 and exits the fluid delivery manifold 60 at one of the plurality of first outlets 74. This fluid is then moved into an opening 132 of the screen 128. Fluid moves from the opening 132 through the mesh screen and through jets 134 to lubricate the journal bearings 84. Two jets are used in this example. The example jets 134 are not limited to convergent/divergent type geometries and may be other types of orifices, nozzles, apertures, etc.

The mesh screen filters particles and other potentially damaging material from the fluid lubricating the journal bearings 84. Other areas of the lubrication system may include other filters in addition to the screen 128. That is, the screen 128 is just one area of the overall system where filtering may occur.

The example screen 128 is made of 15-5PH SST. The screen holes may be laser drilled screen holes having a diameter of 60-80 μm. In other examples, the screen 128 may be made of other materials and may be fabricated utilizing other techniques.

In addition to the tests associated with the screen 100, the example screen 128 may additionally pass a dirt capacity test, and a maximum pressure drop test of the screen.

Another test may be a filtration test to check the screen hole sizes (which should be 60-80 μm absolute).

Features of the disclosed examples include providing individual fluid lines with the required flow rate, pressure and temperature to meet the different lubrication requirement for at least gears, journal bearings, and bearings. The lubrication requirements may change depending on flight and operating conditions. The individual fluid lines provide a portion of the overall lubrication system for the engine, which can include lubricant from various areas of the engine. This lubricant can have varying flow rates and temperatures. The individual flow lines allows for more specific adjustments to the lubricant in this area of the lubrication system.

Although the different examples have the specific components shown in the illustrations, embodiments of this disclosure are not limited to those particular combinations. It is possible to use some of the components or features from one of the examples in combination with features or components from another one of the examples.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A turbomachine fluid delivery manifold comprising:
a manifold providing a journal fluid path and a gear mesh fluid path that is separate from the journal fluid path, wherein the journal fluid path is configured to communicate fluid at a first temperature to a journal bearing of a geared architecture, and the gear mesh fluid path is configured to communicate fluid at a second temperature to a gear mesh of the geared architecture of the turbomachine, the second temperature different than the first temperature.

2. The turbomachine fluid delivery manifold of claim 1, wherein the manifold further provides a bearing fluid path that is separate from both the journal fluid path and the gear mesh path.

3. The turbomachine fluid delivery manifold of claim 1, wherein the journal fluid path is configured to communicate fluid to a journal bearing of a geared architecture of a turbomachine, and the gear mesh path is configured to communicate fluid to a gear mesh of the geared architecture.

4. The turbomachine fluid delivery manifold of claim 1, including a plurality of first outlets from the journal fluid path, and a plurality of second outlets from the gear mesh fluid path, the plurality of first outlets disposed radially outside the plurality of second outlets relative to a direction of flow through the turbomachine.

5. The turbomachine fluid delivery manifold of claim 1, including a plurality of screens each fluidically coupled to one of a plurality of second outlets from the gear mesh fluid path.

6. The turbomachine fluid delivery manifold of claim 5, wherein the plurality of screens comprises at least twice the flow area of the supply passage percent open area.

7. The turbomachine fluid delivery manifold of claim 5, wherein each of the plurality of screens are received within a respective one of a plurality of spray bars.

8. The turbomachine fluid delivery manifold of claim 7, wherein each of the plurality of spray bars provides a conduit configured to communicate fluid from the screen to torque frame pin.

9. The turbomachine fluid delivery manifold of claim 1, wherein the manifold is secured to a geared architecture.

10. The turbomachine fluid delivery manifold of claim 4, wherein at least one of the plurality of second outlets is configured to communicate fluid to a spray bar having a conduit that delivers fluid from the one of the plurality of second outlets to a torque frame pin.

11. A turbomachine lubrication system, comprising:
a geared architecture having a journal bearing and a gear; and
a manifold providing at least a portion of a first fluid path and at least a portion of a second fluid path separate from the first fluid path, the first fluid path operative to communicate a first fluid from a fluid supply to the journal bearing, the second fluid path operative to communicate a second fluid from the fluid supply to a gear mesh, wherein the manifold provides at least a portion of a third fluid path separate from the first and second fluid paths, the third fluid path operative to communicate a third fluid from the fluid supply to a bearing assembly of a turbomachine.

12. The turbomachine lubrication system of claim 11, wherein the first fluid is a fluid at a first temperature, and the second fluid is the fluid at a second temperature different than the first temperature.

13. The turbomachine lubrication system of claim 10, wherein the first fluid path terminates at a plurality of first outlets and the second fluid path terminates at a plurality of second outlets that are circumferentially offset from the plurality of first outlets.

14. The turbomachine lubrication system of claim 10, wherein the first fluid of the fluid supply is fluidically isolated from the second fluid of the fluid supply within the manifold, to permit the first fluid and the second fluid to have an independently maintained temperature, flow rate, or pressure relative to each other.

15. The turbomachine lubrication system of claim 10, wherein the fluid supply includes the first fluid in a first state and the second fluid in a second state that is different than the first state.

16. A method of communicating fluid to a geared architecture of a turbomachine, comprising the steps of:
providing a first path that fluidically couples a first supply of fluid to a journal bearing of a geared architecture; and
providing a second path that fluidically couples a second supply of fluid to a gear mesh of a geared architecture, wherein at least a portion of the first path and at least a portion of the second path are provided by a common manifold, and the first path and the second path are separate and distinct from each other, wherein the first supply of fluid and the second supply of fluid are fluidically isolated to permit the first supply of fluid and the second supply of fluid to have an independently maintained temperature, flow rate, or pressure relative to each other.

17. The method of claim 16, including communicating a third supply of fluid along a third path to a bearing of the turbomachine, wherein at least a portion of the third path is provided by the common manifold, and at least a portion of the third path is provided by the geared architecture.

* * * * *

UNITED STATES PATENT AND TRADEMARK OFFICE
CERTIFICATE OF CORRECTION

PATENT NO. : 9,476,321 B2  Page 1 of 1
APPLICATION NO. : 13/741469
DATED : October 25, 2016
INVENTOR(S) : Tony Haugh, Michael E. McCune and James B. Coffin It is certified that error appears in the above-identified patent and that said Letters Patent is hereby corrected as shown below:

In the Claims

In Claim 1, Column 9, Line 37; after "architecture of" replace "the" with --a--

In Claim 6, Column 9, Line 60; after "twice" replace "the" with --a--

In Claim 6, Column 9, Line 61; before "supply" replace "the" with --a--

Signed and Sealed this
Fourth Day of July, 2017

Joseph Matal
*Performing the Functions and Duties of the*
*Under Secretary of Commerce for Intellectual Property and*
*Director of the United States Patent and Trademark Office*